(12) United States Patent
Ikuta et al.

(10) Patent No.: US 7,874,771 B2
(45) Date of Patent: Jan. 25, 2011

(54) MILLING SPINDLE OF MACHINE TOOL

(75) Inventors: Hiroki Ikuta, Komaki (JP); Hiroki Tazawa, Konan (JP); Yoshikuni Ohta, Kitanagoya (JP); Jojiro Kimura, Ogaki (JP)

(73) Assignee: Yamazaki Mazak Corporation, Aichi pref. (JP)

( * ) Notice: Subject to any disclaimer, the term of this patent is extended or adjusted under 35 U.S.C. 154(b) by 0 days.

(21) Appl. No.: 12/560,737

(22) Filed: Sep. 16, 2009

(65) Prior Publication Data

US 2010/0074706 A1    Mar. 25, 2010

(30) Foreign Application Priority Data

Sep. 24, 2008    (JP)    ............................. 2008-244662

(51) Int. Cl.
*B23C 5/26*    (2006.01)
*B23C 5/28*    (2006.01)
*B23Q 11/12*    (2006.01)

(52) U.S. Cl. ........................ 409/135; 409/231; 409/233; 285/98; 285/96; 285/101; 285/110; 277/349; 277/351; 277/914; 137/580

(58) Field of Classification Search ......... 409/231–233, 409/135–137, 134; 408/56–57, 239 R, 240; 137/580; 285/98, 101, 95, 96, 110; 277/349, 277/351, 423, 563, 914
See application file for complete search history.

(56) References Cited

U.S. PATENT DOCUMENTS 5,676,506 A * 10/1997 Sugata ........................ 409/136

5,707,186 A * 1/1998 Gobell et al. ................ 409/136
5,922,941 A * 7/1999 Winkler et al. .................. 73/40

(Continued)

FOREIGN PATENT DOCUMENTS

EP    1 254 741 A1    11/2006

(Continued)

OTHER PUBLICATIONS

English abstract from the DERWENT database for KR 2005069066-A, which document was published on Jul. 5, 2005, along with clipped image therefrom.*

(Continued)

*Primary Examiner*—Erica E Cadugan
(74) *Attorney, Agent, or Firm*—Renner, Otto, Boisselle & Sklar, LLP

(57) ABSTRACT

The invention provides an improved seal structure of cutting fluid supplied to a spindle of a milling spindle. The milling spindle 100 comprises a spindle 20 supported within a housing via a bearing 16, and a drawbar 24 having a through coolant passage 22. The cutting fluid $C_1$ passing through the rotary joint 40 and 50 is sent to the through coolant passage 22, but a portion thereof is collected in a drain chamber 105. A rotation member 110 is attached to a rear end portion of the spindle 20, which is equipped with a labyrinth device 150 having a lip seal member 152. An air supply member 120 has two air seal members 142 and 144, and air $A_1$ is sent toward the labyrinth device 150, by which an air seal is formed.

4 Claims, 7 Drawing Sheets

U.S. PATENT DOCUMENTS

| | | | | |
|---|---|---|---|---|
| 5,967,716 | A * | 10/1999 | Katsuzawa et al. | 409/134 |
| 6,533,509 | B1 * | 3/2003 | Antoun | 409/233 |
| 6,692,202 | B2 * | 2/2004 | Katsuzawa et al. | 409/135 |
| 7,677,847 | B2 * | 3/2010 | Gebert | 409/231 |
| 7,692,553 | B2 * | 4/2010 | Kubala | 340/605 |
| 2007/0034265 | A1 * | 2/2007 | Mohr et al. | 137/580 |
| 2010/0074707 | A1 * | 3/2010 | Ikuta et al. | 409/233 |

FOREIGN PATENT DOCUMENTS

| | | |
|---|---|---|
| JP | 2002-321138 | 11/2002 |
| WO | WO-90/09053 A * | 8/1990 |
| WO | 2008/011554 A1 | 1/2008 |

OTHER PUBLICATIONS

Machine Translation and drawings from KR-10-2005-0069066-A, which document was published on Jul. 5, 2005.*

European Search Report for corresponding European Application No. 09405146.3 dated Apr. 14, 2010.

* cited by examiner

MILLING SPINDLE OF MACHINE TOOL

The present application is based on and claims priority of Japanese patent application No. 2008-244662 filed on Sep. 24, 2008, the entire contents of which are hereby incorporated by reference.

BACKGROUND OF THE INVENTION

1. Field of the Invention

The present invention relates to a milling spindle of a machine tool, and more specifically, to a milling spindle of a machine tool having an improved seal structure for preventing cutting fluid within the milling spindle from leaking from a rotary joint portion to a bearing portion or a motor.

2. Description of the Related Art

FIGS. 5 through 7 show a general structure of a milling spindle of a machine tool.

FIG. 5 is a cross-sectional view showing the structure of a milling spindle, and FIG. 6 is an enlarged cross-sectional view showing the relevant portion thereof.

A milling spindle denoted as a whole by reference number 1 includes a spindle 20 supported within the housing 10 via front-side bearings 12 and 14 and a rear-side bearing 16. A drawbar 24 for drawing a tool into or out of the spindle is disposed in the spindle 20, and at the center of the drawbar 24 is formed a through coolant passage 22 for supplying cutting fluid to the tool.

A rotor 30 of a motor is attached to an outer circumference portion of the spindle 20, constituting a motor with a stator 32.

A rotation-side joint 40 is attached to a rear end portion of the drawbar 24, which constitutes a rotary joint with a joint 50 fixed to the housing 10.

The cutting fluid supplied from a passage 52 of the fixed-side joint 50 is sent via a passage 42 of the rotation-side joint 40 to the through coolant passage 22. A minute gap $G_1$ is formed between the fixed-side joint 50 and the rotation-side joint 40, and a small amount of cutting fluid is leaked through this gap $G_1$.

Due to the structure of the rotary joint, it is difficult to prevent such leakage of cutting fluid completely.

Therefore, a structure is adopted in which a drain hole 60 communicating a drain chamber 62 formed within the housing 10 and the exterior of the housing is provided, so as to discharge the leaked cutting fluid to the exterior of the milling spindle.

The entry of cutting fluid to the bearing 16 or the motor unit 30 and 32 damages the drive unit composed of the bearing and motor and causes serious defects, so that a labyrinth device 70 is disposed to prevent the cutting fluid from entering the drive unit.

However, as shown in FIG. 7, if for some reason a large amount of cutting fluid $C_1$ leaks from the rotary joint portion into the drain chamber 62, the cutting fluid may not be sufficiently discharged through the drain hole 60, and a portion of the cutting fluid $C_1$ may pass through the labyrinth device 70 and damage the bearing 16 or the motor 30 and 32.

Japanese patent application laid-open publication No. 2002-321138 (patent document 1) discloses one example of a mechanism for preventing the cutting fluid leaked from the rotary joint portion of the spindle from entering the drive unit.

SUMMARY OF THE INVENTION

The present invention aims at solving the problems of the prior art by providing a milling spindle of a machine tool having a sealing device for preventing cutting fluid from entering the drive mechanism such as a bearing or a motor of the spindle without fail, even when a large amount of cutting fluid is leaked from the rotary joint portion.

In order to achieve the above objects, the present invention provides a milling spindle comprising a spindle supported via a bearing within a housing of the main spindle, a motor disposed within the housing for driving the spindle directly, a drawbar inserted slidably within the spindle, a through coolant passage disposed in an axial center of the drawbar for supplying cutting fluid, a rotary joint disposed on a rear end side of the drawbar and sending the cutting fluid supplied from a fixed side toward the spindle being rotated, a drain chamber disposed within the housing for storing the cutting fluid leaking from the rotary joint, a rotation member attached to a rear end portion of the spindle and facing the drain chamber, an air supply member fixed to the housing and facing the rotation member, an air sealing device attached to the air supply member and making up an air seal with the rotation member, and a labyrinth device having a lip seal member for preventing the cutting fluid in the drain chamber from entering the space in which the motor is disposed.

The air sealing device comprises a first air seal member disposed on a side in which the labyrinth device is disposed, a second air seal member disposed on a side in which the drive mechanism is disposed, and an air discharge port opened between the first and second air seal members.

Further, each air seal member includes two inclined surfaces and a peak portion composed of the two inclined surfaces, and the properties of the inclined surfaces are selected so that air passes through the first air seal member.

Moreover, the lip seal member of the labyrinth device has a leading end portion thereof bent toward the drain chamber.

According to the milling spindle of a machine tool according to the present invention, the cutting fluid leaking from the rotary joint portion can be prevented from entering the drive unit reliably by the labyrinth device and the sealing device having air seals.

DETAILED DESCRIPTION OF THE PREFERRED EMBODIMENTS

Figure 1:
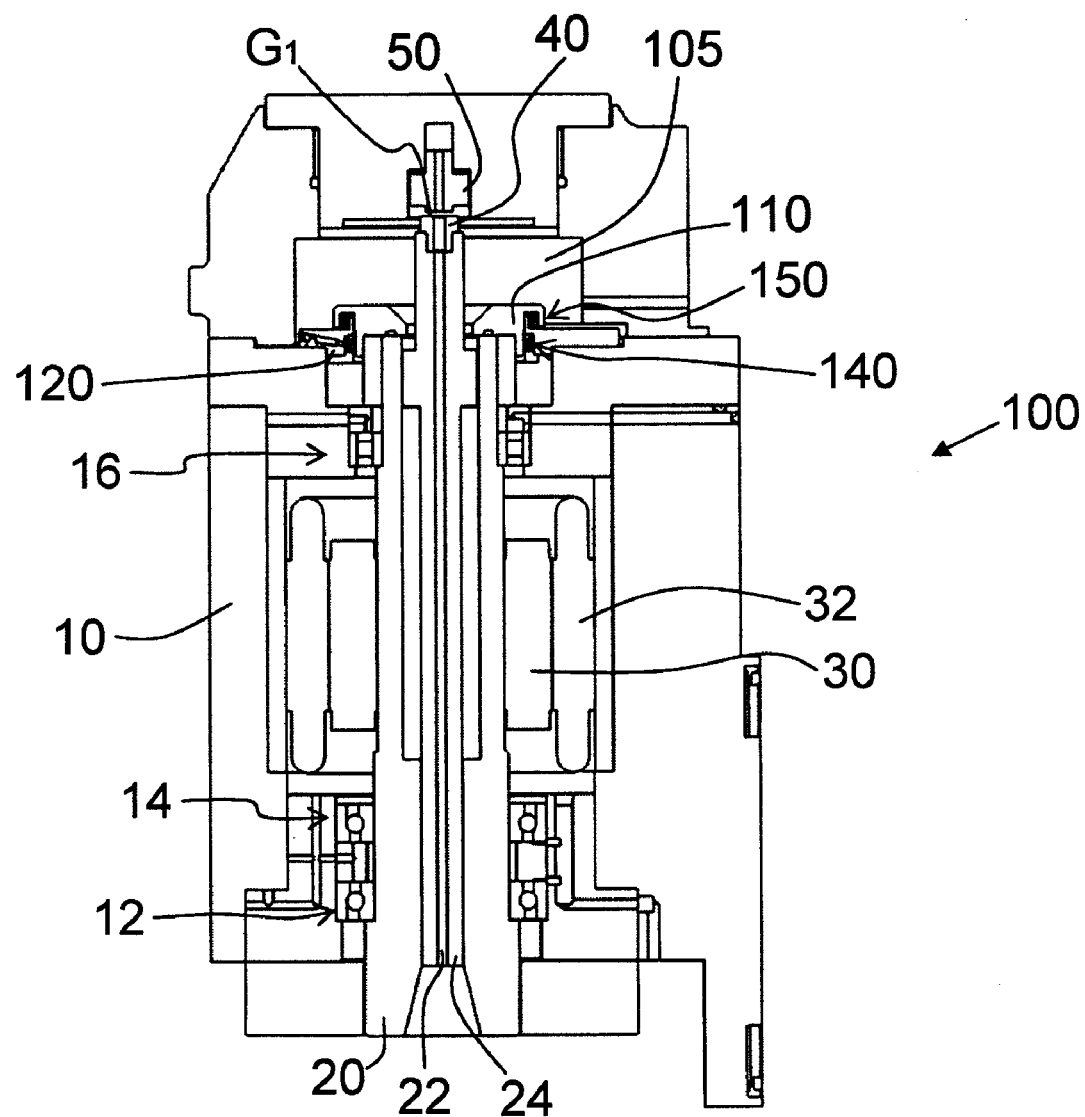
FIG. 1 is a cross-sectional view showing the milling spindle of a machine tool according to the present invention.
Figure 2:
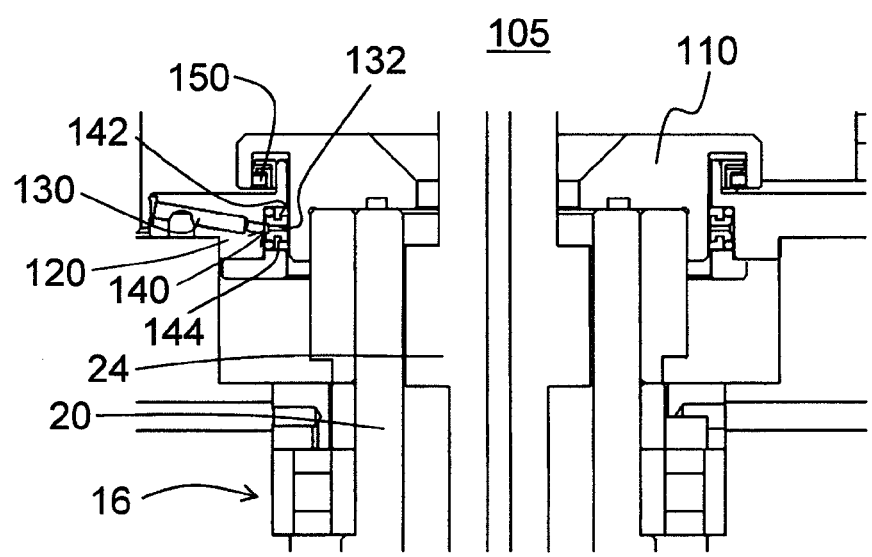
FIG. 2 is a cross-sectional view of the relevant portion thereof.

FIG. 1 is a cross-sectional view showing a structure of a milling spindle of a machine tool according to the present invention, and FIG. 2 is a cross-sectional view of a relevant portion thereof.

Figure 5:
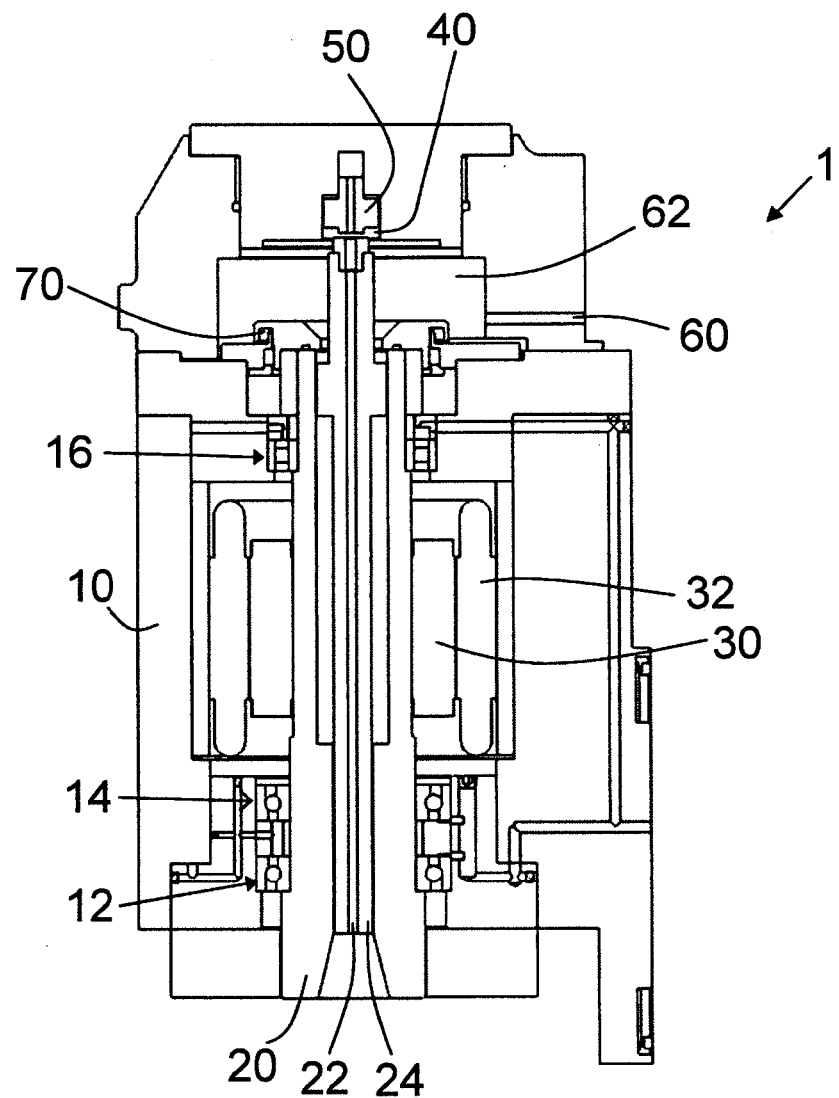
FIG. 5 is a cross-sectional view showing the structure of the milling spindle of the machine tool.
Figure 6:
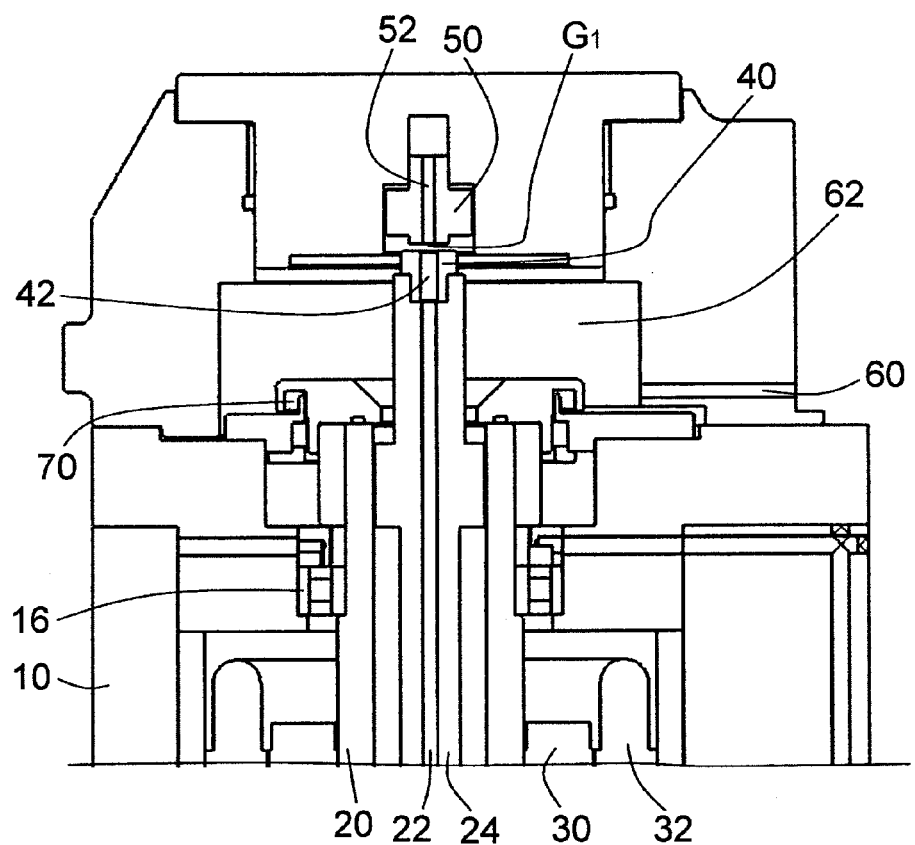
FIG. 6 is an enlarged cross-sectional view of the relevant portion.
Figure 7:
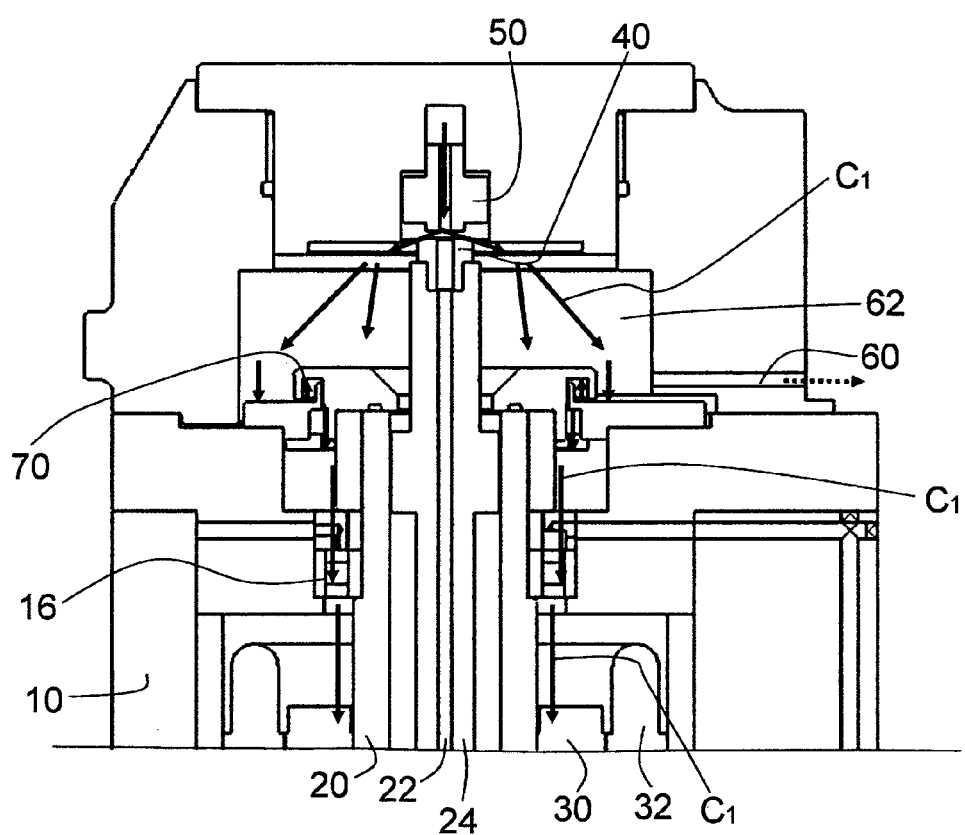
FIG. 7 is an explanatory view showing the flow of cutting fluid.

The milling spindle of the machine tool according to the present invention denoted as a whole by reference number 100 comprises a spindle 20 supported within a housing 10 via bearings 12, 14 and 16. The structures of a drawbar 24, a through coolant passage 22, a rotor 30 and a stator 32 are similar to those described with reference to FIG. 5, so they are provided with the same reference numbers and the detailed descriptions thereof are omitted.

In the present milling spindle 100, similar to the prior art mentioned earlier, a rotary joint is formed by a fixed-side joint 50 and a rotation-side joint 40 attached to an end of a drawbar 24.

Similar to the aforementioned milling spindle, a gap $G_1$ is formed between the fixed-side joint 50 and the rotation-side joint 40.

The milling spindle 100 of the present invention also has a drain chamber 105 formed within a housing 10.

Below the drain chamber 105 are disposed a rotation member 110 attached integrally to the spindle 20 and an air supply member 120 attached to the housing 10. An air sealing device 140 is disposed between the inner circumference portion of the air supply member 120 and the outer circumference portion of the rotation member 110, and a labyrinth device 150 is disposed between the rotation member 110 and the drain chamber 105.

Figure 3:
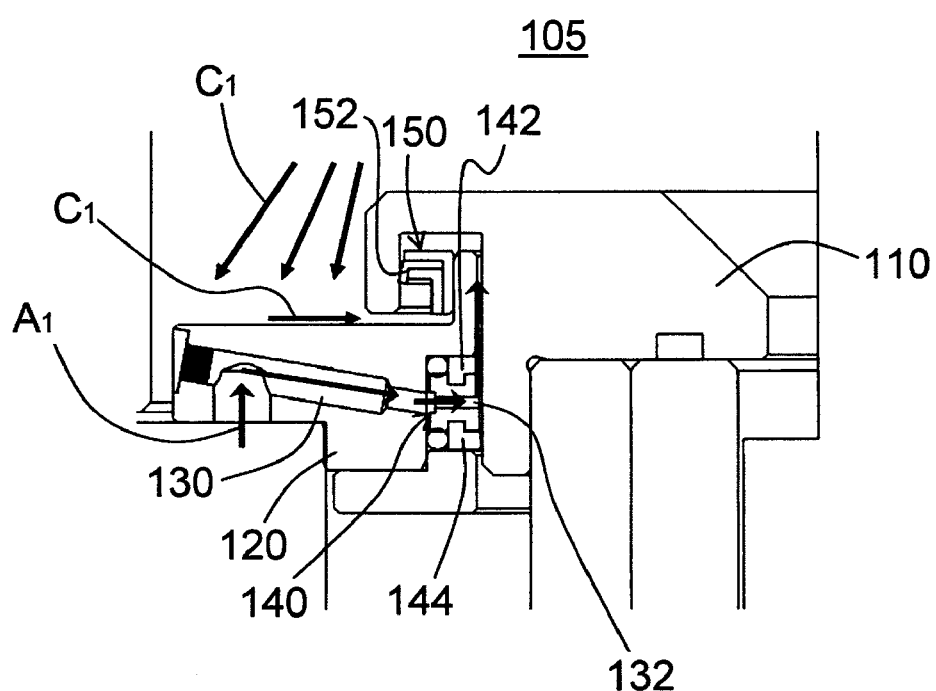
FIG. 3 is a detailed view of a sealing device according to the present invention.

FIG. 3 illustrates the detail of the sealing device according to the present invention. The air supply member 120 comprises an air passage 130, and receives supply of air $A_1$ from the housing. The air discharge port 132 formed at the leading end of the air passage 130 opens between stepped air seal members 142 and 144 constituting the air sealing device 140.

The air $A_1$ supplied to the air sealing device 140 forms an air flow moving toward the labyrinth device 150 in a manner described later.

Figure 4:
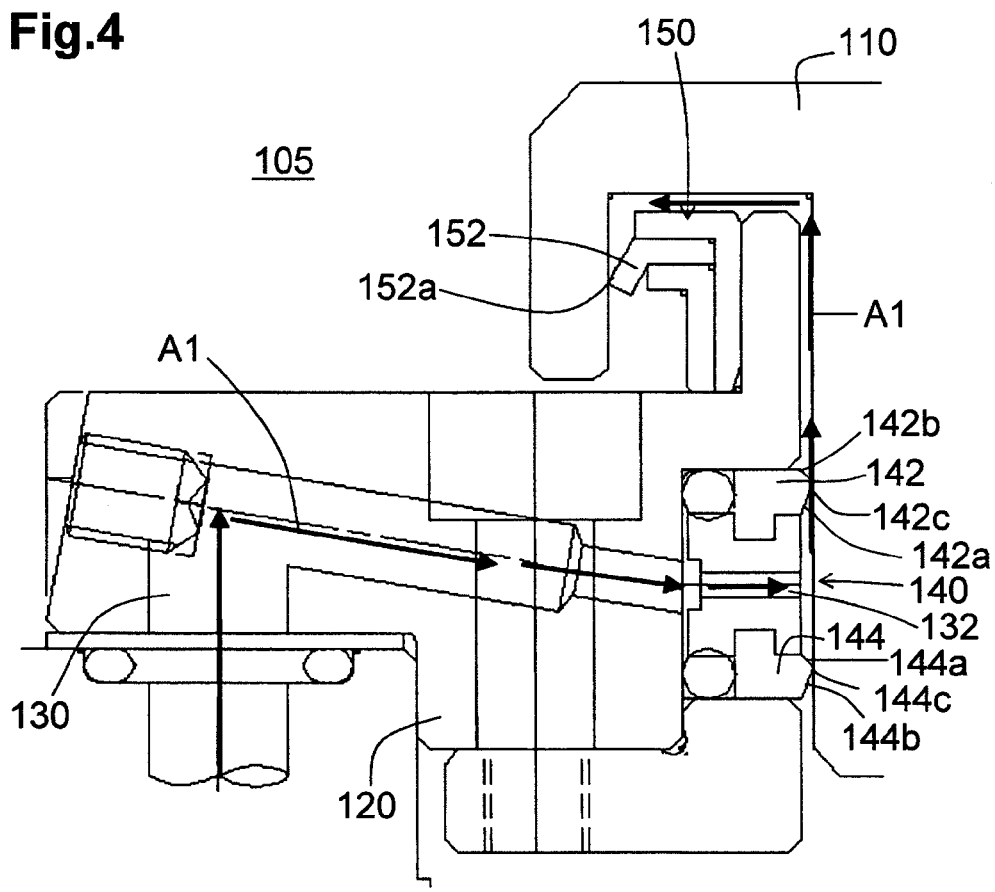
FIG. 4 is an explanatory view showing the functions of the present invention.

FIG. 4 illustrates the functions of the air sealing device 140.

The air sealing device 140 comprises stepped air seal members 142 and 144 having their inner circumference portions coming in contact with the outer circumference portion of the rotation member 110. The air discharge port 132 opens at a center area between the stepped air seal members 142 and 144.

The first air seal member 142 disposed on the side closer to the labyrinth device 150 has a peak portion 142c composed of two inclined surfaces 142a and 142b.

Similarly, the second air seal member 144 disposed on the side closer to the drive unit including the bearing and the motor has a peak portion 144c composed of two inclined surfaces 144a and 144b.

By appropriately selecting the specifications of the inclined surfaces of the first and second air seal members 142 and 144, it becomes possible to enable the air $A_1$ to flow through the air seal member 142 and head toward the labyrinth device 150.

In a normal state where the hydraulic pressure of the cutting fluid within the drain chamber 105 is low, the air $A_1$ pushes down the lip seal member 152 of the labyrinth device 150 form above, forming an appropriate clearance between the leading end portion 152a of the lip seal member 152 and the rotation member 110 and preventing abrasion of the lip seal member 152.

When a large amount of cutting fluid $C_1$ leaks out for some reason from the rotary joint portion, the inner pressure of the drain chamber 105 is raised. The cutting fluid $C_1$ having raised pressure pushes up the lip seal member 152 of the labyrinth device 150 and presses the leading end portion 152a of the lip seal member 152 against the rotation member 110. According to this operation, the sealing performance of the lip seal member is improved, by which the cutting fluid $C_1$ is prevented from entering the drive unit.

The cutting fluid $C_1$ acting on the lip seal member 152 functions as a lubricant, and protects the lip seal member 152.

As described, the main spindle according to the present invention is equipped with a sealing device having an air sealing device and a labyrinth device with a lip seal member, so that even if a large amount of cutting fluid leaks from the rotary joint portion disposed in the interior of the main spindle, cutting fluid is prevented from entering the drive unit including the bearings and the motor, and the damage can be minimized.

What is claimed is:

1. A milling spindle of a machine tool comprising:
    a rotary spindle supported via a bearing within a housing of the milling spindle;
    a motor disposed within the housing for driving the rotary spindle directly;
    a drawbar inserted slidably within the rotary spindle;
    a through coolant passage disposed in an axial center of the drawbar for supplying cutting fluid;
    a rotary joint disposed on a rear end side of the drawbar and sending the cutting fluid supplied from a fixed side of the rotary joint toward the rotary spindle being rotated;
    a drain chamber disposed within the housing for storing the cutting fluid leaking from the rotary joint;
    a rotation member attached to a rear end portion of the rotary spindle and facing the drain chamber;
    an air supply member fixed to the housing and facing the rotation member;
    an air sealing device attached to the air supply member and making up an air seal with the rotation member; and
    a labyrinth device having a lip seal member for preventing the cutting fluid in the drain chamber from entering the space in which the motor is disposed.

2. The milling spindle of a machine tool according to claim 1, wherein
    the air sealing device comprises a first air seal member disposed on a side of the air sealing device in which the labyrinth device is disposed, a second air seal member disposed on a side of the air sealing device in which the motor is disposed, and an air discharge port opened between the first and second air seal members.

3. The milling spindle of a machine tool according to claim 2, wherein
    each air seal member of the air sealing device includes two inclined surfaces and a peak portion composed of the two inclined surfaces, the properties of the inclined surfaces selected so that air passes through the first air seal member.

4. The milling spindle of a machine tool according to claim 1, wherein
    the lip seal member of the labyrinth device has a leading end portion thereof bent toward the drain chamber.

\* \* \* \* \*